Figure 1:
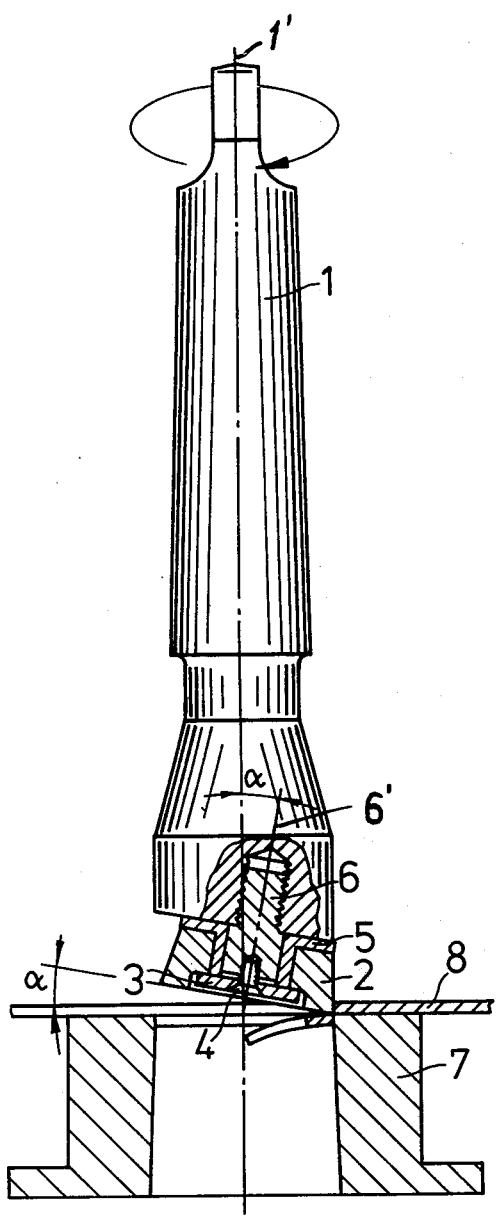

United States Patent [19]

Bengtsson

[11] 4,074,603

[45] Feb. 21, 1978

[54] NIBBLING TOOL

[76] Inventor: Ulf Bengtsson, 11 Valhallagatan, Linkoping, Sweden

[21] Appl. No.: 704,692

[22] Filed: July 12, 1976

[30] Foreign Application Priority Data

July 15, 1975 Sweden ................................ 7508079

[51] Int. Cl.² ............................................. B23D 27/00
[52] U.S. Cl. ........................................ 83/596; 30/240; 83/595; 83/916
[58] Field of Search ................... 83/237, 350, 523, 595, 83/596, 694, 916, 262; 408/87, 101, 102, 144, 187, 199, 713; 30/228, 240

[56] References Cited

U.S. PATENT DOCUMENTS

| 2,180,823 | 11/1939 | Harrison | 29/90 |
| 2,230,455 | 2/1941 | Githens | 408/187 X |
| 3,143,911 | 8/1964 | Dickerson | 83/350 |

Primary Examiner—Z. R. Bilinsky
Attorney, Agent, or Firm—Haseltine, Lake & Waters

[57] ABSTRACT

A nibbling tool for contour cutting and for forming holes in a plate or the like, comprising one movable and one stationary member, and a supporting element with a shaft. The shaft has a first longitudinal axis, and the supporting element is rotatable about that axis by a motor, is adjustable in an axial direction, and may be set in a predetermined relationship relative to the stationary member. The movable element has a second longitudinal axis and is rotatable therearound. The axes subtend an acute angle with one another for the movable element to have a predetermined spaced relationship with respect to the supporting element, so that a plate may be inserted between the stationary member and a point of the movable member closest to the stationary member upon the supporting element having been set with respect to the stationary member.

9 Claims, 2 Drawing Figures

NIBBLING TOOL

This invention relates to a nibbling tool, i.e. a tool for shaping plates along their outer as well as their inner edges (in recesses or holes). As a rule known nibbling tools consist of a punch and a dolly, the tool moving upwards and downwards. Upon the motion of the tool approximately half-moon shaped pieces are cut from the plate edge. In conventional nibbling machines the upward and downward motion is achieved by means of a rod mechanism, hydraulically or in other suitable fashion, the plate being fed manually between the two parts of the tool.

Thus, the known nibbling tools have required a forward and backward motion, which has made their construction relatively complicated, and it has not been possible to use existing rotary devices, e.g. drilling machines.

This invention relates to a nibbling tool, which only requires a rotating drive and which consists of only a few parts. According to the present invention, the nibbling tool can be easily adapted for use in a drilling machine or the like, which makes the installation of a special machine unnecessary.

The nibbling tool of the present invention substantially consists of a movable member cooperating with a stationary member, the movable member being rotatably mounted around an axis relative to a supporting element, which in turn is adapted to be rotated around its axis by means of a motor or the like and to be adjusted in an axial direction and fixed relative to the stationary member, both the axes of rotation being adapted to form an angle with each other so that the oblique position of the movable member will be sufficient for a plate to be introduced between the stationary member and the most remote point of the movable member.

In a specially simple and suitable embodiment of the invention the movable member consists of a cutting edge in the form of the frustrum of a cone, which is rotatably adapted at an oblique end surface of a supporting element in the form of a rotatable mandrel or the like, the cutting edge being hardened around its lower, larger base surface.

By means of this arrangement, a rocking motion is imparted to the edge upon rotation of the mandrel, the edge cooperating with an annular dolly for cutting off the plate.

Figure 2:
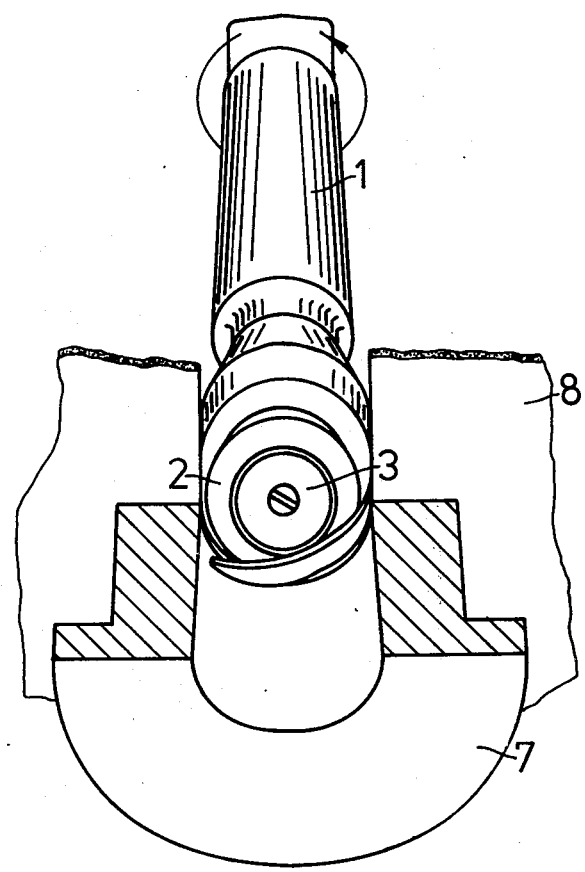

A nibbling tool according to the invention will be described below in more detail with reference to the enclosed drawing, where;

FIG. 1 shows a section of a nibbling tool according to the present invention; and FIG. 2 shows the tool from below partly in section.

As is evident from the drawing a mandrel 1 is provided with a lower oblique and plane cutting tool surface having the shape of a non-illustrated ellipse. At a side of a shaft of the mandrel and obliquely relative thereto a bore is formed for an axle-journal 6 having an axis 6', on which journal 6 an annullar cutting 2 is mounted. Between the tool 2 and the mandrel 1 there is disposed a bushing 5 made, preferably of bronze, nylon or the like. The tool or edge 2 is retained by a washer 3 and a screw 4. The tool 2 is in this way rotatable around the axis 6' of the journal 6. The angle between the axis 6' of the cutting tool 2 and the longitudinal axis 1' of the mandrel 1 is designated by $\alpha$.

The nibbling other part of the tool is a dolly 7.

Before use, the mandrel 1 is moved axially down to a position, where the lowermost peripheral part of the cutting tool 2 abuts an upper surface of the dolly 7, the plane of a lower surface of the cutting tool 2 and an upper surface of the dolly 7 forming an angle $\alpha$ with each other. A plate 8 is inserted between the cutting tool 2 and the dolly 7.

When the mandrel 1 is rotated, the lowermost portion of the cutting tool 2 will describe a circle, which is tangent to a cutting edge of the dolly 7. When the tangent point moves around, an approximately half-moon shaped piece or sliver will be separated from the plate 8. The plate is then moved in small increments so that the desired edge working takes place. The motion of the plate 8 can be controlled manually or numerically using means known per se.

When the plate 8 is inserted between the dolly 7 and the edge or tool 2, as the mandrel 1 is imparted a rotary motion, the edge 2 will stop rotating relative to the dolly 7 due to the friction against the plate 8 and performs instead a rocking motion under the action of rotational mandrel 1 and journal 6 rotating therewith which causes the plate 8 to be sheared off against the cutting edge of the dolly 7.

The resultant of the cutting forces will act on the edge 2 within a restricted angular sector thereof. It has been found that a suitable acute angle is about 80°, at a plate thickness of 2 mm. The angle between the axis 1' of the mandrel 1 and the axis 6' of the edge or tool 2 may preferably be about 10°.

As in the case of known nibbling tools the smoothness of the section surface or a lack thereof will be dependent on the feed speed of the plate 8 or the like.

Of course one can, as an alternative, arrange the dolly 7 to be rotatable in the same way as the edge 2 of the embodiment described above, and have the dolly 7 work against a stationary cutting edge. In that case the rotatable dolly is preferably designed in such a way that any pieces cut off from the plate 8 are removed through the interior of the rotary dolly.

According to the inventive idea it is not necessary that the cutting edge and the dolly be circular, for other embodiments are also possible in other applications.

Thus it is possible to let the cutting edge be square, and impart a controlled rotation to it, e.g. working against a straight dolly edge. In that way substantially rectilinear cuts can be obtained. It is essential that the motion of the cutting member be achieved by rotation around two axes forming an angle with each other.

What I claim is:

1. A nibbling tool for contour cutting and forming holes in a plate, said tool comprising first and second opposed members between which a plate is inserted for being cut, each one of said members having a cutting edge each said edge lying in their respective plane; a shaft rotatable about a first longitudinal axis, means rotatably supporting said first member from said shaft for rotation about a second axis which is inclined at an acute angle with respect to the first axis, said second axis being inclined with respect to the plane of said second member such that the cutter plane of the first member is inclined with respect to the cutter plane of the second member at said acute angle, said first and second members being spaced such that insertion of a plate therebetween will frictionally block rotation of said first member about said second axis and produce rocking of said first member about said first axis, as said shaft rotates, for cutting said plate.

2. A nibbling tool as claimed in claim 1 comprising means for adjusting the relative spacing between said first and second members.

3. A nibbling tool as claimed in claim 2 wherein said means for adjusting the relative spacing between said members comprises a journal threaded in said shaft and means securing said first member on said journal.

4. A nibbling tool as claimed in claim 3 said first member is rotatable on said journal.

5. A nibbling tool as claimed in claim 1 wherein said member with the cutting edge comprises an annular body in the shape of a frustrum of a cone, the larger base of the cone facing the other of said members and having an edge constituting said cutting edge.

6. A nibbling tool as claimed in claim 5 wherein said cutting edge is hardened.

7. A nibbling tool as claimed in claim 5 comprising a journal threaded in said shaft, said annular body being rotatable on said journal, and means for axially securing said annular body to said journal while permitting relative rotation therebetween.

8. A nibbling tool as claimed in claim 7 comprising a bushing between said annular body and said journal.

9. A nibbling tool as claimed in claim 5 wherein said other member comprises a dolly having an opening facing said annular body.

* * * * *